United States Patent
Li et al.

(10) Patent No.: US 11,435,839 B2
(45) Date of Patent: Sep. 6, 2022

(54) TOUCH PAD MODULE

(71) Applicant: CHICONY ELECTRONICS CO., LTD., New Taipei (TW)

(72) Inventors: Po-Hsin Li, New Taipei (TW); Wen-Han Chang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/461,046

(22) Filed: Aug. 30, 2021

(65) Prior Publication Data

US 2022/0171475 A1    Jun. 2, 2022

(30) Foreign Application Priority Data

Dec. 2, 2020 (TW) ................................. 10914246.6

(51) Int. Cl.
*G06F 3/041* (2006.01)
*G06F 3/0354* (2013.01)

(52) U.S. Cl.
CPC ................................ *G06F 3/03547* (2013.01)

(58) Field of Classification Search
CPC ....... G06F 1/169; G06F 3/03547; G06F 3/041
See application file for complete search history.

(56) References Cited

U.S. PATENT DOCUMENTS

| | | | |
|---|---|---|---|
| 8,982,062 B2 * | 3/2015 | Bos | G06F 3/04883 345/173 |
| 9,069,394 B2 * | 6/2015 | Clayton | G06F 3/03547 |
| 9,292,051 B2 * | 3/2016 | Takata | G06F 1/169 |
| 9,490,088 B2 * | 11/2016 | Kagayama | A63F 13/285 |
| 9,542,016 B2 * | 1/2017 | Armstrong-Muntner | G06F 3/042 |
| 9,645,615 B2 * | 5/2017 | Lee | G06F 3/041 |
| 10,861,659 B1 * | 12/2020 | Chen | H01H 21/24 |
| 10,884,512 B2 * | 1/2021 | Li | G06F 1/1671 |
| 10,886,081 B1 * | 1/2021 | Li | G06F 3/0202 |
| 11,287,907 B1 * | 3/2022 | Li | G06F 3/03547 |
| 2004/0135767 A1 * | 7/2004 | Park | G06F 3/0338 345/156 |
| 2006/0250377 A1 * | 11/2006 | Zadesky | G06F 3/0362 345/173 |
| 2013/0207928 A1 * | 8/2013 | Takata | G06F 3/03547 345/174 |

(Continued)

FOREIGN PATENT DOCUMENTS

| CN | 211828544 U | * 10/2020 | ........ G06F 3/0414 |
|---|---|---|---|
| TW | M597911 U | 7/2020 | |

*Primary Examiner* — Joe H Cheng
(74) *Attorney, Agent, or Firm* — Muncy, Geissler, Olds & Lowe, P.C.

(57) ABSTRACT

The present invention discloses a touch pad module, which includes a touch panel, an elastomer and a noise reducing film. The touch panel has a bottom surface. The elastomer is disposed on the bottom surface of the touch panel. The noise reducing film covers the elastomer. The noise reducing film includes a fixing portion, an opening and an elastic arm structure. The fixing portion is disposed on the bottom surface of the touch panel. The opening is located in the fixing portion. The elastic arm structure extends from the fixing portion to an inside of the opening and corresponds to the elastomer. The elastic arm structure includes a suspended portion and a plurality of elastic arms, and the elastic arms extend from the suspended portion to the fixing portion.

13 Claims, 8 Drawing Sheets

(56) References Cited

U.S. PATENT DOCUMENTS

| | | |
|---|---|---|
| 2014/0043272 A1 | 2/2014 | Okumura et al. |
| 2019/0155391 A1* | 5/2019 | Hashimoto ............. G06F 3/016 |
| 2019/0243475 A1* | 8/2019 | Huang .................. G06F 1/1681 |
| 2021/0151267 A1 | 5/2021 | Pai et al. |
| 2021/0263556 A1* | 8/2021 | Degner .................. G06F 1/169 |

* cited by examiner ent of the present invention, each of the elastic arms extends from the fixing portion in a direction away from the touch panel.

In an embodiment of the present invention, the elastomer is disposed in the convex portion.

In an embodiment of the present invention, the touch pad module further comprises a cushion disposed on a surface of the elastic arm structure.

In an embodiment of the present invention, the cushion is disposed on an inner surface of the elastic arm structure and located between the elastic arm structure and the elastomer.

In an embodiment of the present invention, the outer diameter of the cushion is less than the outer diameter of the elastomer.

In an embodiment of the present invention, the cushion is disposed on an outer surface of the elastic arm structure.

In an embodiment of the present invention, the touch pad module further comprises a frame disposed under the touch panel, wherein the noise reducing film is located between the touch panel and the frame.

In an embodiment of the present invention, the cushion is located between the outer surface of the elastic arm structure and the frame.

As mentioned above, the touch pad module of the present invention comprises a touch panel, an elastomer and a noise reducing film. The elastomer is disposed on the bottom surface of the touch panel, and the noise reducing film covers the elastomer. Further, the noise reducing film comprises an elastic arm structure. The elastic arm structure comprises a suspended portion and a plurality of elastic arms, and the elastic arms extend from the suspended portion to the fixing portion. Because the noise reducing film is located between the touch panel and the frame, the noise reducing film may absorb the impact force to reduce the noise of the elastomer contacting the frame. In addition, the elastic arm structure and the elastic arms thereof can absorb the recovery force of the elastomer to reduce the noise of the elastomer rebounding.

TOUCH PAD MODULE

BACKGROUND

1. Technical Field

The present invention relates to a touch pad module.

2. Description of the Related Art

A notebook computer is often equipped with a touch pad module to allow users to operate the notebook computer by touch (using a finger to press or slide on the touch pad) to replace the function of the mouse.

Generally speaking, the main components of the touch pad module comprise a touch panel and a frame. One side of the touch panel can be fixed to the frame or directly fixed to the casing of the notebook computer, while the other unfixed side is a movable end. In addition, the touch panel module has an elastomer, which is usually a dome sheet. The elastomer is disposed on a bottom surface of the touch panel and located in the middle position of the movable end. When the user presses the movable end, the touch panel can move up and down and trigger an input command.

Specifically, the user may press the touch panel such that the elastomer (i.e., dome sheet) presses against the frame and triggers a click signal. However, when the elastomer (i.e., dome sheet) collapses and contacts the frame, the impact will produce noise, and when the elastomer rebounds (i.e., returns to the original position), it will also produce noise, resulting in a poor user experience. There is indeed a need for improvement.

SUMMARY

In view of the above issues, it is an objective of the present invention to provide a touch pad module to resolve the issue of noise of the conventional touch pad module through a noise reducing film covering an elastomer.

In order to achieve the above objective, the present invention provides a touch pad module, which comprises a touch panel, an elastomer and a noise reducing film. The touch panel has a bottom surface. The elastomer is disposed on the bottom surface of the touch panel. The noise reducing film covers the elastomer. The noise reducing film comprises a fixing portion, an opening and an elastic arm structure. The fixing portion is disposed on the bottom surface of the touch panel. The opening is located in the fixing portion. The elastic arm structure extends from the fixing portion to an inside of the opening and corresponds to the elastomer. The elastic arm structure comprises a suspended portion and a plurality of elastic arms, and the elastic arms extend from the suspended portion to the fixing portion.

In an embodiment of the present invention, each of the elastic arms has at least one bending portion.

In an embodiment of the present invention, the elastic arms extend toward the fixing portion such that they surround the suspended portion.

In an embodiment of the present invention, the elastic arms are symmetrically disposed between the suspended portion and the fixing portion.

In an embodiment of the present invention, the suspended portion is farther away from the touch panel than the fixing portion, such that the elastic arm structure forms a convex portion.

BRIEF DESCRIPTION OF THE DRAWINGS

In the drawings, wherein similar reference numerals denote similar elements throughout the several views.

DETAILED DESCRIPTION OF THE EMBODIMENTS

In order to make the structure and characteristics as well as the effectiveness of the present disclosure further understood and recognized, a detailed description of the present disclosure is provided as follows, along with embodiments and accompanying figures.

Figure 1:
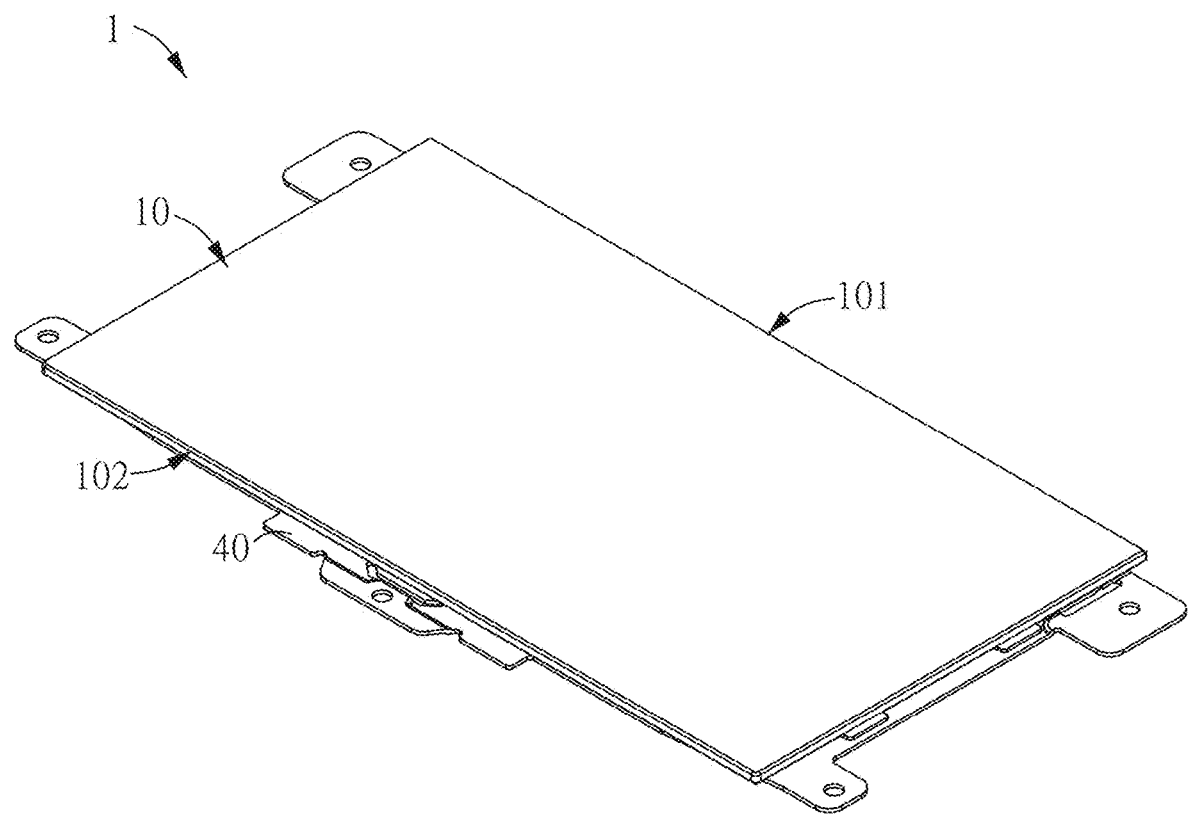
FIG. 1 is a schematic diagram of a touch pad module in one embodiment of the present invention.
Figure 2:
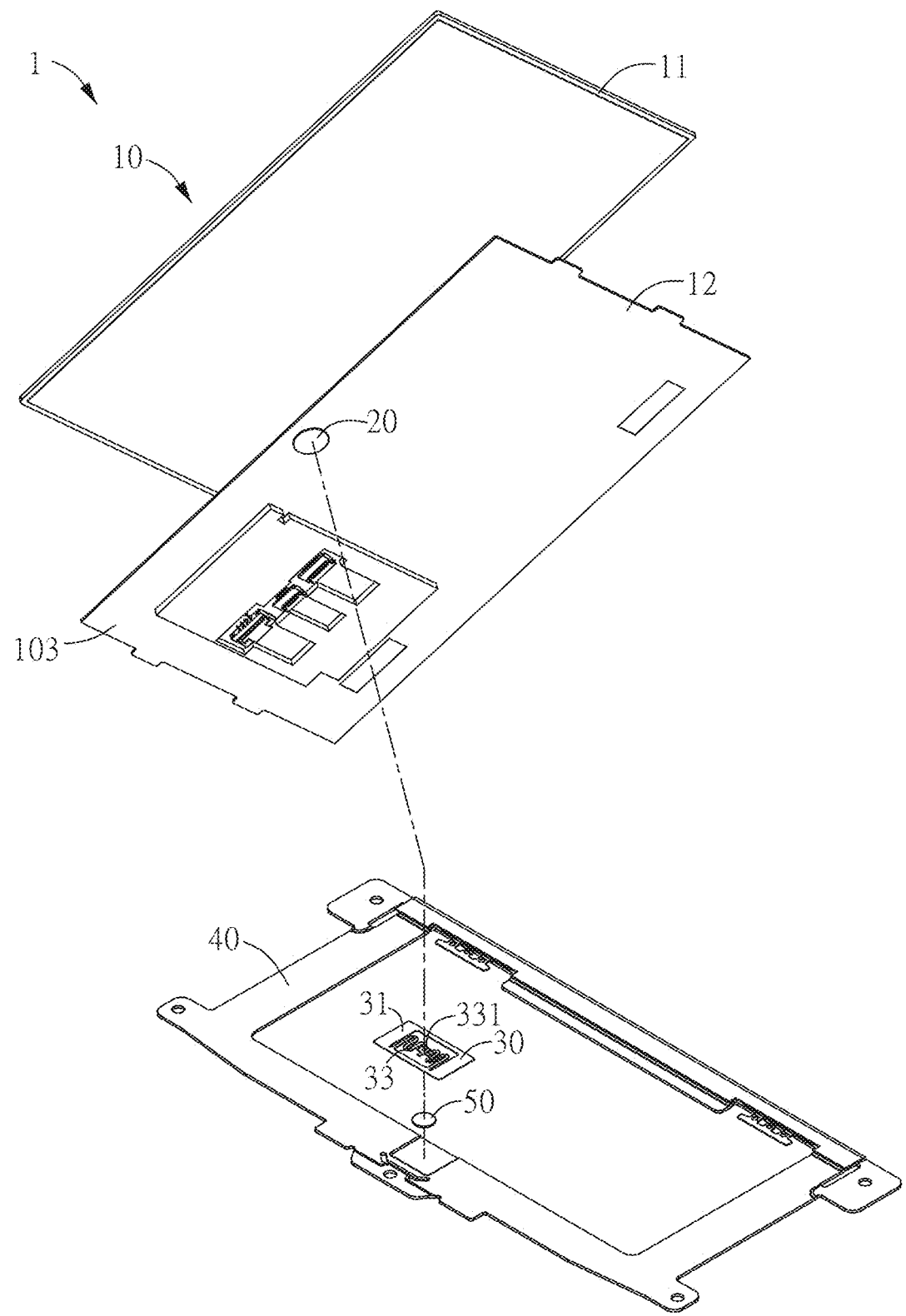
FIG. 2 is an exploded schematic diagram of the touch pad module shown in FIG. 1.
Figure 3:
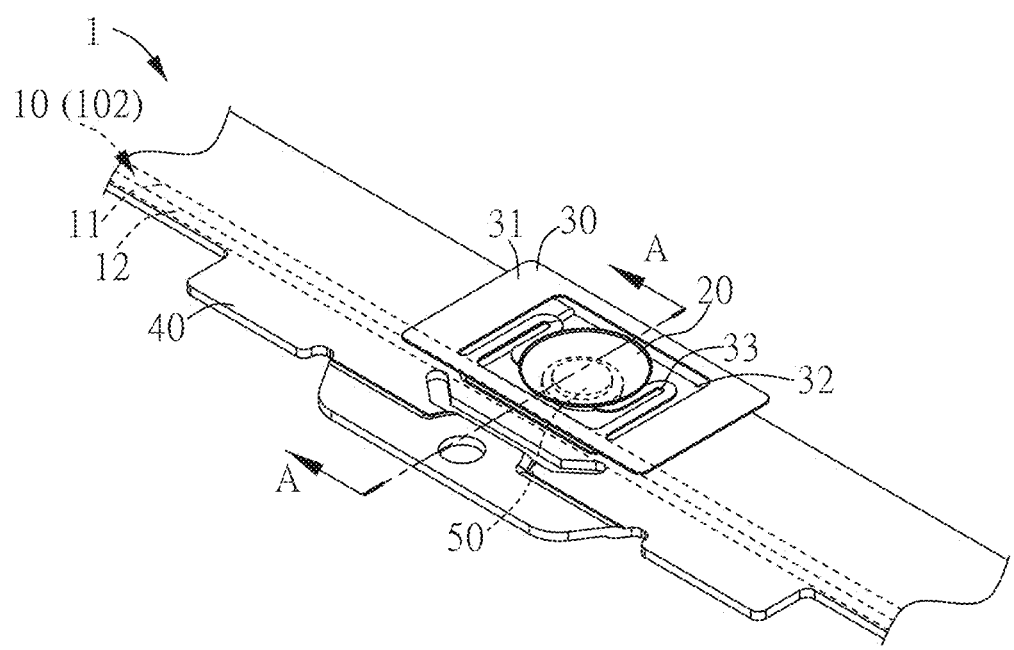
FIG. 3 is an enlarged schematic diagram of the touch pad module shown in FIG. 1 at a movable end.
Figure 4:
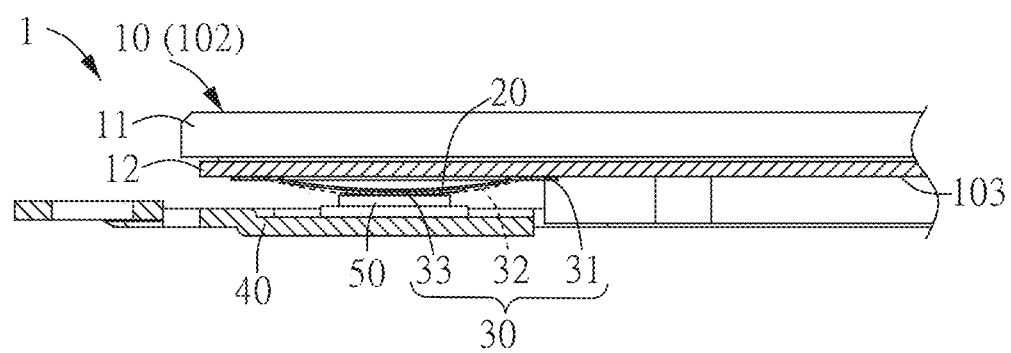
FIG. 4 is a schematic cross-sectional view of the touch pad module shown in FIG. 3 along the line A-A.

FIG. 1 is a schematic diagram of a touch pad module in one embodiment of the present invention; FIG. 2 is an exploded schematic diagram of the touch pad module shown in FIG. 1; FIG. 3 is an enlarged schematic diagram of the touch pad module shown in FIG. 1 at a movable end; and FIG. 4 is a schematic cross-sectional view of the touch pad module shown in FIG. 3 along the line A-A. Please refer to FIG. 1, FIG. 2, FIG. 3 and FIG. 4. The touch pad module 1 of this embodiment can be applied to an electronic device, and the touch pad module 1 may be but is not limited to a notebook computer. The touch pad module 1 may be disposed on the casing of the electronic device for the user to operate the electronic device in a touch mode and replace the function of a mouse. In this embodiment, the touch pad module 1 comprises a touch panel 10, an elastomer 20, a noise reducing film 30 and a frame 40. Preferably, the touch panel 10 comprises a touch board 11 and a circuit board 12. The touch board 11 is a component for the user to perform a touch operation and can be made of, for example but not limited to, glass or Mylar. The circuit board 12 is disposed under the touch board 11. In other embodiments, the touch board 11 and the circuit board 12 may also be a single board; the present invention is not limited thereto. It should be noted that the touch panel 10 shown in FIG. 3 is represented by a broken line.

The frame 40 is disposed under the touch pane 10 and located under the circuit board 12. Specifically, the touch board 11 and the circuit board 12 are disposed above the frame 40 and disposed on the casing of the electronic device by the frame 40, but the present invention is not limited thereto. In another embodiment, the frame 40 may be a part of the casing of the electronic device. In addition, the touch panel 10 has a fixed end 101 and a movable end 102 opposite to each other. As shown in FIG. 1, one side of the touch panel 10 is fixed to the frame 40 such that one side of the touch panel 10 acts as the fixed end 101, and the opposite side is the movable end 102.

As shown in FIG. 2 and FIG. 4, the touch panel 10 has a bottom surface 103, which refers to the bottom surface of the circuit board 12 herein. The elastomer 20 is disposed on the bottom surface 103 of the touch panel 10 and located at the movable end 102. After a user presses the touch panel 10, the elastomer 20 provides a recovery force to return the touch panel 10 to the original position. In this embodiment, the elastomer 20 is a metal dome sheet. In another embodiment, the elastomer 20 may be a spring, but the present intension is not limited thereto. When the user presses the area adjacent to the movable end 102, the touch panel 10 can move up and down and trigger an input command. However, when the touch panel 10 is pressed, the elastomer 20 collapses, and the subsequent rebound action will cause noise. Further, when the elastomer 20 contacts the frame 40, it will also cause an impact sound. In this embodiment, the noise reducing film 30 is provided to achieve the effect of reducing noise. In this embodiment, the noise reducing film 30 is disposed on the bottom surface 103 of the touch panel 10 to cover the elastomer 20.

Figure 5A:
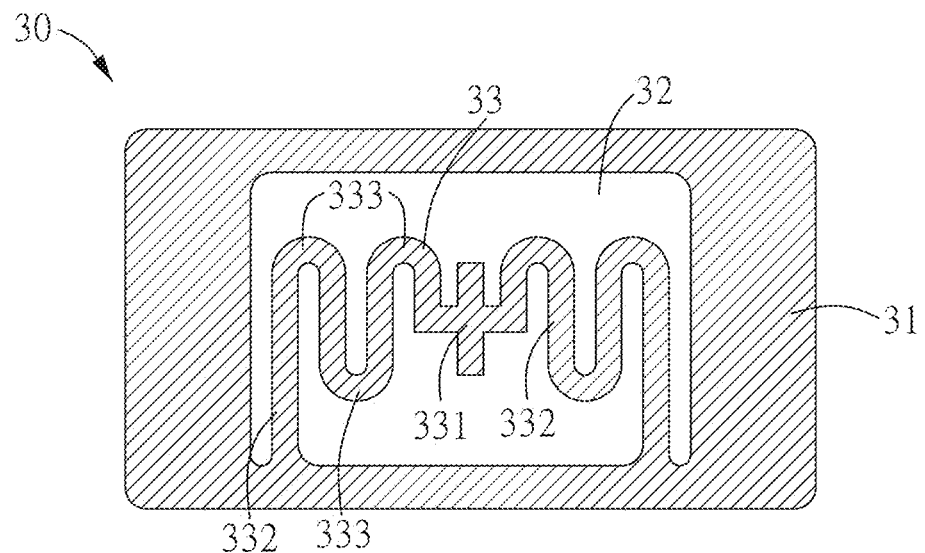
FIG. 5A is a top view of a noise reducing film shown in FIG. 2.
Figure 5B:
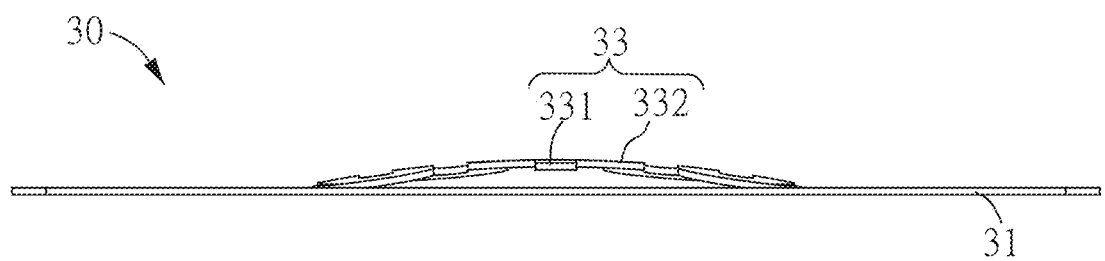
FIG. 5B is a side view of the noise reducing film shown in FIG. 5A.
Figure 5C:
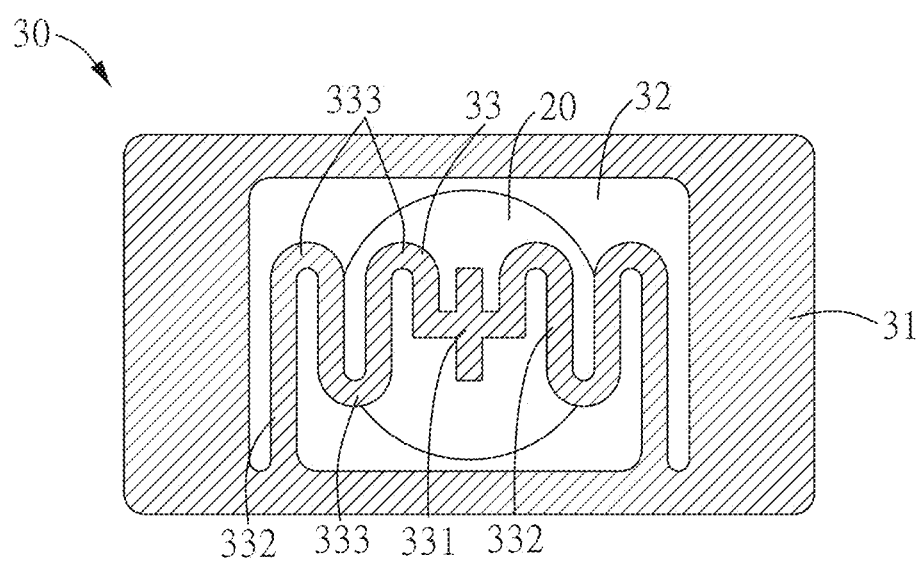
FIG. 5C is a bottom view of the noise reducing film shown in FIG. 2 after covering an elastomer.

FIG. 5A is a top view of the noise reducing film shown in FIG. 2, FIG. 5B is a side view of the noise reducing film shown in FIG. 5A, and FIG. 5C is a bottom view of the noise reducing film shown in FIG. 2 after covering an elastomer. Please refer to FIG. 5A, FIG. 5B and FIG. 5C. Specifically, the noise reducing film 30 comprises a fixing portion 31, an opening 32 and an elastic arm structure 33. The opening 32 is located in the fixing portion 31, and the elastic arm structure 33 extends from the fixing portion 31 to an inside of the opening 32. In other words, the structure located outside the opening 32 is the fixing portion 31, and the structure located outside the opening 32 is the elastic arm structure 33.

Regarding the assembly of the noise reducing film 30 with the touch panel 10, after the opening 32 is corresponded to the elastomer 20, the fixing portion 31 is disposed on the bottom surface 103 of the touch panel 10 such that the noise reducing film 30 covers the elastomer 20 and the elastic arm structure 33 is also corresponded to the elastomer 20, as shown in FIG. 4. Preferably, the fixing portion 31 may be disposed on the bottom surface 103 of the touch panel 10 in an adhesive manner. Preferably, the opening 32 may be located on the center of the noise reducing film 30 so that the fixing portion 31 has a sufficient area to adhere to the touch panel 10.

As shown in FIG. 5A, the elastic arm structure 33 of this embodiment comprises a suspended portion 331 and a plurality of elastic arms 332. The elastic arms 332 extend from the suspended portion 331 to the fixing portion 31. Preferably, the suspended portion 331 may correspond to a geometric center of the elastomer 20 (as shown in FIG. 2) and be connected to the elastomer 20. In this embodiment, the suspended portion 331 adheres to the geometric center of the elastomer 20. Because the noise reducing film 30 is located between the touch panel 10 and the frame 40, the noise reducing film 30 can absorb the impact force to reduce the noise of the elastomer 20 contacting the frame 40. Moreover, the elastic arm structure 33 corresponds to the elastomer 20 such that the elastic arm structure 33 and elastic arms 332 thereof can absorb the recovery force of the elastomer 20. Specifically, the elastomer 20 moves toward the elastic arm structure 33 and presses against the elastic arm structure 33 while the touch panel 10 is being pressed. When the elastic arm structure 33 is pressed by the elastomer 20, the elastic arms 332 deform and generate elastic force so that the elastic arms 332 can absorb the recovery force of the elastomer 20 to reduce the noise of the elastomer 20 rebounding.

In addition, the arrangement of the suspended portion 331 corresponding to the geometric center of the elastomer 20 enables the elastic arm structure 33 to press stably the elastomer 20. Specifically, when the touch panel 10 is pressed, even if the applied force does not correspond to the elastomer 20, the elastic arm structure 33 can balance the downward movement of the elastomer 20 to prevent the touch panel 10 from lateral deflection. In this embodiment, the suspended portion 331 is a cross structure so as to correspond to the geometric center of the elastomer 20. In another embodiment, the suspended portion 331 may be other structures that correspond to the geometric center of the elastomer 20; the present invention is not limited thereto.

Preferably, each of the elastic arms 332 has at least one bending portion 333. In this embodiment, each of the elastic arms 332 has three bending portions 333 such that the overall conformation of each of the elastic arms 332 is a wave. The wave-shaped bending portion 333 can increase the strength of the elastic arm structure 33. When acted upon by an external force, that is, when the elastic arm structure 33 is pressed by the elastomer 20, the wave-shaped bending portion 333 helps to reduce the resulting stress concentration. Further, the design of the wave-shaped bending portion 333 is such that the pressed curve of the touch pad module 1 is hardly affected when it is pressed. Specifically, the bending portion 333 connects to the suspended portion 331, and the suspended portion 331 adheres to the elastomer 20. Therefore, when the elastomer 20 is pressed, the bending portion 333 may be slightly deformed, thereby not affecting the click feeling generated by the elastomer 20. In other words, the click feeling of the user pressing the touch pad module 1 (which has the noise reducing film 30) is similar to the click feeling of the user pressing a conventional touch pad module having no noise reducing film 30. It should be noted that a conventional touch pad module may have a membrane which has no opening and directly covers the elastomer (e.g., a metal spring). When the elastomer of the conventional touch pad module is pressed, the elastomer will be pulled by the membrane (which has no opening) such that the click feeling of the user is affected. The design of the noise reducing film 30 having an opening 32 of this embodiment can achieve the effect of noise reduction without affecting the click feeling.

In another embodiment, each of the elastic arms 332 may be linear, and the whole of the arm structure 33 is radially disposed in the opening 32. Preferably, the arm structure 33 may be radially disposed at the cross corners of the opening 32, but the present invention is not limited thereto.

Preferably, the elastic arms 332 are symmetrically disposed between the suspended portion 331 and the fixing portion 31. In this embodiment, both the fixing portion 31 and the opening 32 are quadrilateral, and the elastic arm structure 33 has two elastic arms 332. Further, the two elastic arms 332 respectively extend from the two opposite sides of the suspended portion 331 to the fixing portion 31 and extend to the same side of the opening 32 (e.g., the bottom side of the opening 32, as shown in FIG. 5). In other embodiments, the opening 32 may be other shapes, such as circular, ellipsoid, or other polygonal shapes. Further, the elastic arms 332 may also be of other numbers or shapes and only need to be symmetrically disposed in the opening 32. In addition, the present invention also does not limit the number or the bending conformation of the bending portions 333.

Please refer to FIG. 4 and FIG. 5B. Preferably, the suspended portion 331 is farther away from the touch panel 10 than the fixing portion 31, such that the elastic arm structure 33 forms a convex portion. Specifically, the fixing portion 31 is attached to the bottom surface 103 of the touch panel 10, and each of the elastic arms 332 extends from the fixing portion 31 in a direction away from the touch panel 10 such that the entire the elastic arm structure 33 protrudes from the touch panel 10. With the aforementioned structures, the elastomer 20 can be accommodated in the convex portion (i.e., the elastic arm structure 33). The noise reducing film 30 may be made of a plastic material, such as polyethylene terephthalate (PET) or polycarbonate (PC), etc.; it can also be made of a soft material, such as sponge or rubber, etc. In addition, the convex portion may be formed by stamping or thermoforming the noise reducing film 30.

Figure 6A:
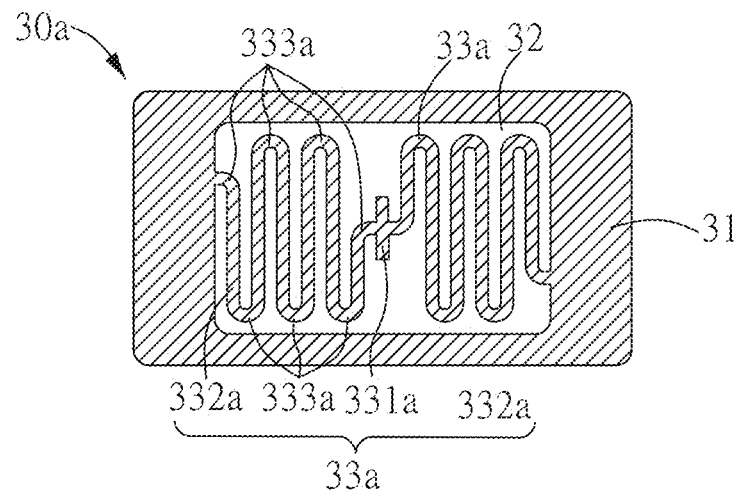
FIG. 6A is a top view of a noise reducing film in another embodiment of the present invention.

FIG. 6A is a top view of a noise reducing film in another embodiment of the present invention. Please refer to FIG. 6A. In this embodiment, the noise reducing film 30a also comprises a fixing portion 31, an opening 32 and an elastic arm structure 33a. The structures of the fixing portion 31 and the opening 32 are the same as those of the previous embodiment, so the same reference numerals are used. Further, the elastic arm structure 33a comprises a suspended portion 331a and two elastic arms 332a. Each of the elastic arms 332a has seven bending portions 333a, and the elastic arms 332a on two sides have fourteen bending portions 333a in total. In other words, each of the elastic arms 332a extends from the suspended portion 331a to the fixing portion 31, and each of the elastic arms 332a connects to the fixing portion 31 after bending seven times. In addition, the two elastic arms 332a respectively extend from the two opposite sides of the suspended portion 331a to the fixing portion 31, and extend to two opposite short sides of the opening 32 (e.g., the left side and the right side of the opening 32 shown in FIG. 6A).

Figure 6B:
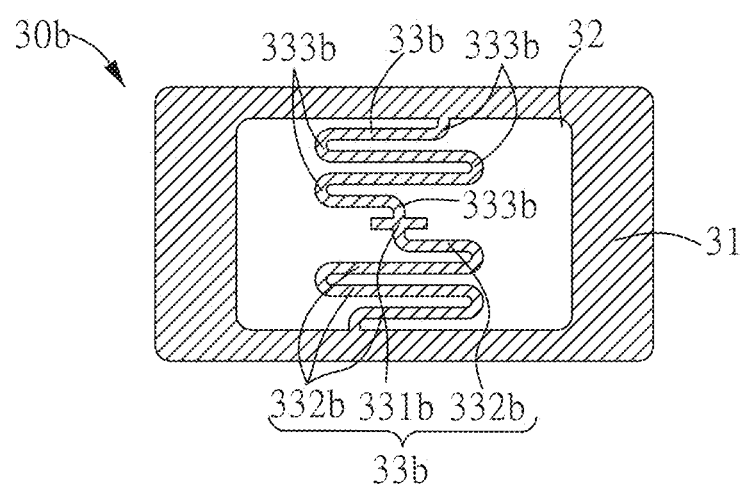
FIG. 6B is a top view of a noise reducing film in one more embodiment of the present invention.

FIG. 6B is a top view of a noise reducing film 30b of one more embodiment of the present invention. Please refer to FIG. 6B. In this embodiment, each of the elastic arms 332b of the elastic arm structure 33b has five bending portions 333b; that is, the elastic arms 332b on two sides have ten bending portions 333b in total. Further, each of the elastic arms 332b extends from the suspended portion 331b to the fixing portion 31, and each of the elastic arms 332b connects to the fixing portion 31 after bending five times. In addition, the two elastic arms 332b respectively extend from the two opposite sides of the suspended portion 331b to the fixing portion 31 and extend to the two opposite long sides of the opening 32 (e.g., the upper side and the bottom side of the opening 32 shown in FIG. 6B). In other words, the present invention does not limit the number of bending portions 333b or the positions where the bending portions 333b connect to the fixing portion 31.

Figure 6C:
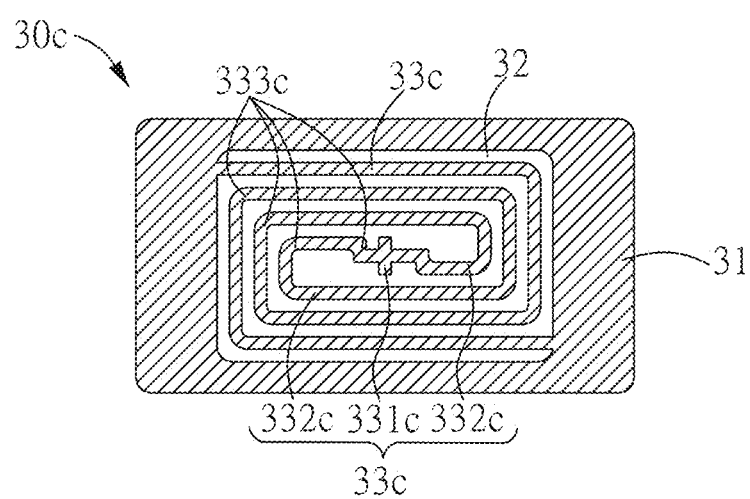
FIG. 6C is a top view of a noise reducing film in one more embodiment of the present invention.

FIG. 6C is a top view of a noise reducing film of one more embodiment of the present invention. Please refer to FIG. 6C. In this embodiment, the elastic arms 332c extend toward the fixing portion 31 such that they surround the suspended portion 331c. Each of the elastic arms 332c of this embodiment has seven bending portions 333c (FIG. 6C shows only a portion of the bending portions 333c). That is, each of the elastic arms 332c extends from the suspended portion 331c, and each of the elastic arms 332c connects to the fixing portion 31 after bending around the suspended portion 331c seven times. In addition, in this embodiment, two elastic arms 332c respectively extend from the two opposite sides of the suspended portion 331c to the fixing portion 31 and extend to the two opposite short sides of the opening 32 (e.g., the right side and the left side of the opening 32 shown in FIG. 6B). In other embodiments, the elastic arms 332c may extend from the suspended portion 331c and connect to the two opposite long sides of the opening 32 (e.g., the upper side and the bottom side of the opening 32) after bending around the suspended portion 331c; the present invention is not limited thereto.

Please refer to FIG. 2, FIG. 3, FIG. 4 and FIG. 5C. Preferably, the touch pad module 1 further comprises a cushion 50. The cushion 50 is disposed on one surface of the elastic arm structure 33. In this embodiment, the cushion 50 is disposed on an outer surface of the elastic arm structure 33 and is located between the outer surface of the elastic arm structure 33 and the frame 40. Specifically, the cushion 50 is made of a soft material to absorb the impact force between the elastomer 20 and the frame 40 and achieve a better effect of noise reduction.

Preferably, the outer diameter of the cushion 50 is less than the outer diameter of the elastomer 20. In other words, the outer diameter of the elastomer 20 is greater than the outer diameter of the cushion 50. Thus, when the cushion 50 is located in the center of the elastomer 20, the cushion 50 does not overlap with the edge of the elastomer 20. The aforementioned size limitation can prevent the cushion 50 from obstructing the falling movement of the elastomer. Specifically, if the outer diameter of the cushion 50 is greater than the outer diameter of the elastomer 20, the cushion 50 will cover the elastomer 20. When the elastomer 20 collapses and falls due to the pressing force, the edge of the elastomer 20 will be obstructed by the cushion 50, resulting in flanging.

Figure 7A:
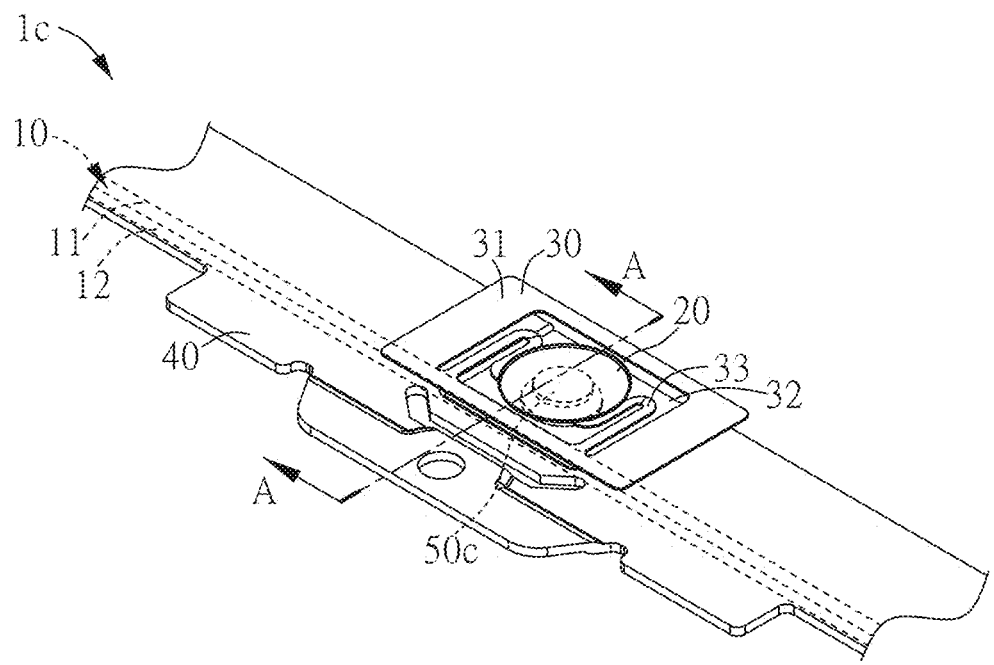
FIG. 7A is an enlarged schematic diagram of a touch pad module of another embodiment of the present invention at the movable end.
Figure 7B:
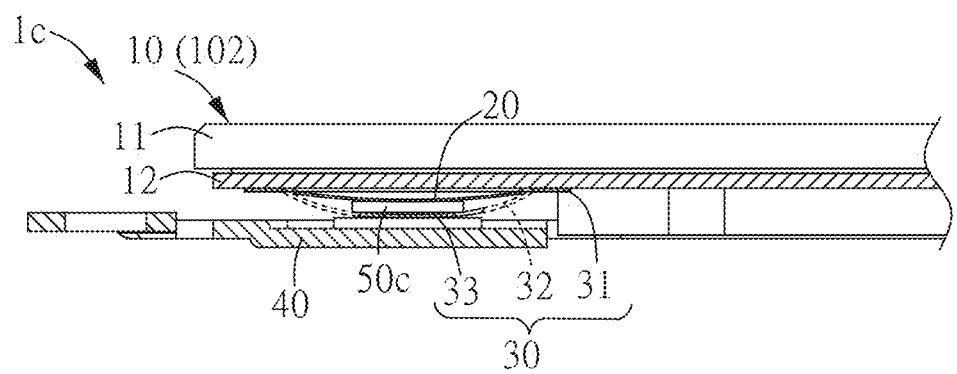
FIG. 7B is a schematic cross-sectional view of the touch pad module shown in FIG. 7A along the line A-A.

FIG. 7A is an enlarged schematic diagram of a touch pad module of another embodiment of the present invention at the movable end, and FIG. 7B is a schematic cross-sectional view of the touch pad module shown in FIG. 7A along the line A-A. Please refer to FIG. 7A and FIG. 7B. The difference between the touch pad module 1c of this embodiment and the touch pad module 1 of the previous embodiment is the disposition of the cushion 50c, so the same reference numerals denote the same elements. In this embodiment, the cushion 50c is disposed on an inner surface of the elastic arm structure 33 and is located between the elastic arm structure 33 and the elastomer 20. The cushion 50c is provided to absorb the impact force between the elastomer 20 and the frame 40 and achieve a better effect of noise reduction.

As mentioned above, the touch pad module of the present invention comprises a touch panel, an elastomer and a noise reducing film. The elastomer is disposed on the bottom surface of the touch panel, and the noise reducing film covers the elastomer. Further, the noise reducing film comprises an elastic arm structure. The elastic arm structure comprises a suspended portion and a plurality of elastic arms, and the elastic arms extend from the suspended portion to the fixing portion. Because the noise reducing film is located between the touch panel and the frame, the noise reducing film may absorb the impact force to reduce the noise of the elastomer contacting the frame. In addition, the elastic arm structure and the elastic arms thereof can absorb the recovery force of the elastomer to reduce the noise of the elastomer rebounding.

It should be noted that the described embodiments are only for illustrative and exemplary purposes and that various changes and modifications may be made to the described embodiments without departing from the scope of the application as disclosed by the appended claims.

What is claimed is:

1. A touch pad module, comprising:
    a touch panel having a bottom surface; an elastomer, disposed on the bottom surface of the touch panel; and
    a noise reducing film covering the elastomer, the noise reducing film comprising:
        a fixing portion, disposed on the bottom surface of the touch panel;
        an opening, located in the fixing portion; and
        an elastic arm structure, corresponding to the elastomer and extending from the fixing portion to an inside of the opening, the elastic arm structure comprising a suspended portion and a plurality of elastic arms, and the elastic arms extend from the suspended portion to the fixing portion.

2. The touch pad module of claim 1, wherein each of the elastic arms has at least one bending portion.

3. The touch pad module of claim 1, wherein the elastic arms extend toward the fixing portion such that they surround the suspended portion.

4. The touch pad module of claim 1, wherein the elastic arms are symmetrically disposed between the suspended portion and the fixing portion.

5. The touch pad module of claim 1, wherein the suspended portion is farther away from the touch panel than the fixing portion, such that the elastic arm structure forms a convex portion.

6. The touch pad module of claim 5, wherein each of the elastic arms extends from the fixing portion in a direction away from the touch panel.

7. The touch pad module of claim 5, wherein the elastomer is disposed in the convex portion.

8. The touch pad module of claim 1, further comprising:
    a cushion disposed on a surface of the elastic arm structure.

9. The touch pad module of claim 8, wherein the cushion is disposed on an inner surface of the elastic arm structure and located between the elastic arm structure and the elastomer.

10. The touch pad module of claim 8, wherein the outer diameter of the cushion is less than the outer diameter of the elastomer.

11. The touch pad module of claim 8, wherein the cushion is disposed on an outer surface of the elastic arm structure.

12. The touch pad module of claim 11, further comprising:
    a frame disposed under the touch panel, wherein the noise reducing film is located between the touch panel and the frame.

13. The touch pad module of claim 12, wherein the cushion is located between the outer surface of the elastic arm structure and the frame.

* * * * *